(12) United States Patent
Durand et al.

(10) Patent No.: US 12,184,504 B1
(45) Date of Patent: Dec. 31, 2024

(54) DECOMPOSITION OF MONOLITHS INTO MULTI-ACCOUNT PROVIDER NETWORK STRUCTURES

(71) Applicant: Amazon Technologies, Inc., Seattle, WA (US)

(72) Inventors: Didier Germain Durand, Jougne (FR); Ilia Gilderman, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 129 days.

(21) Appl. No.: 17/836,795

(22) Filed: Jun. 9, 2022

(51) Int. Cl.
| | |
|---|---|
| *H04L 41/14* | (2022.01) |
| *G06F 8/76* | (2018.01) |
| *H04L 41/12* | (2022.01) |
| *H04L 43/08* | (2022.01) |

(52) U.S. Cl.
CPC ............ *H04L 41/145* (2013.01); *G06F 8/76* (2013.01); *H04L 41/12* (2013.01); *H04L 43/08* (2013.01)

(58) Field of Classification Search
CPC ........ H04L 41/145; H04L 41/12; H04L 43/08
See application file for complete search history.

(56) References Cited

U.S. PATENT DOCUMENTS

| | | | | |
|---|---|---|---|---|
| 11,153,394 | B1* | 10/2021 | Eberlein | H04L 67/61 |
| 2014/0280932 | A1* | 9/2014 | Braun | H04L 63/10 |
| | | | | 709/225 |
| 2014/0359129 | A1* | 12/2014 | Sharma | H04L 67/148 |
| | | | | 709/226 |
| 2015/0058459 | A1* | 2/2015 | Amendjian | H04L 41/20 |
| | | | | 709/223 |

* cited by examiner

*Primary Examiner* — Fadi Haj Said
(74) *Attorney, Agent, or Firm* — Nicholson De Vos Webster & Elliott LLP

(57) ABSTRACT

Remapping mainframe functional components from a mainframe computing environment onto a network of distinct but communicating accounts of a provider network. The mainframe computer (or network of such computers) is analyzed hierarchically through one or more of physical separation between logical partitions (LPARs), LPARs within the mainframe computer(s), separation of batch and transactional workloads, separation of batch and transactional accounts, or security of the mainframe architecture. Mainframe application artifacts obtained through the analyzing are used to generate a graph model representing relationships among the mainframe application artifacts. The graph model includes nodes representing the mainframe application artifacts and edges connecting pairs of the mainframe application artifacts, where the edges represent use relationships between the pairs of mainframe application artifacts. The nodes are then clustered, where the clusters represent sets of mainframe artifacts having high density of use relationships, and the clusters correspond to the distinct accounts in the provider network.

20 Claims, 9 Drawing Sheets

DECOMPOSITION OF MONOLITHS INTO MULTI-ACCOUNT PROVIDER NETWORK STRUCTURES

BACKGROUND

Modernizing software applications is a common task for business organizations and other entities desiring to improve their information technology (IT) environments in response to changing software application use cases, resource demands, and user access patterns. For example, while many legacy applications were designed for older operating environments with lesser expectations, modern applications now often need the ability to allow for faster innovation via dynamic architectural changes, scale quickly to potentially millions of users, have global availability, manage very large amounts of data, and respond to requests in milliseconds. The processes for upgrading, converting, rewriting, etc. such applications to enable improved performance is referred to generally as software modernization. Software application modernization and software-based system modernization can include, for example, porting legacy applications or systems to modern computer programming languages or application frameworks, updating software libraries, protocols, or hardware platforms, and the like. For organizations desiring to make use of provider network resources, the modernization process can further include migrating resources from an organization's on-premises environment to a provider network, thereby enabling modernizing an application's architecture with containers, serverless functions, and other scalable architecture tools provided by provider networks.

BRIEF DESCRIPTION OF DRAWINGS

Various embodiments in accordance with the present disclosure will be described with reference to the drawings, in which.

DETAILED DESCRIPTION

Figure 1:
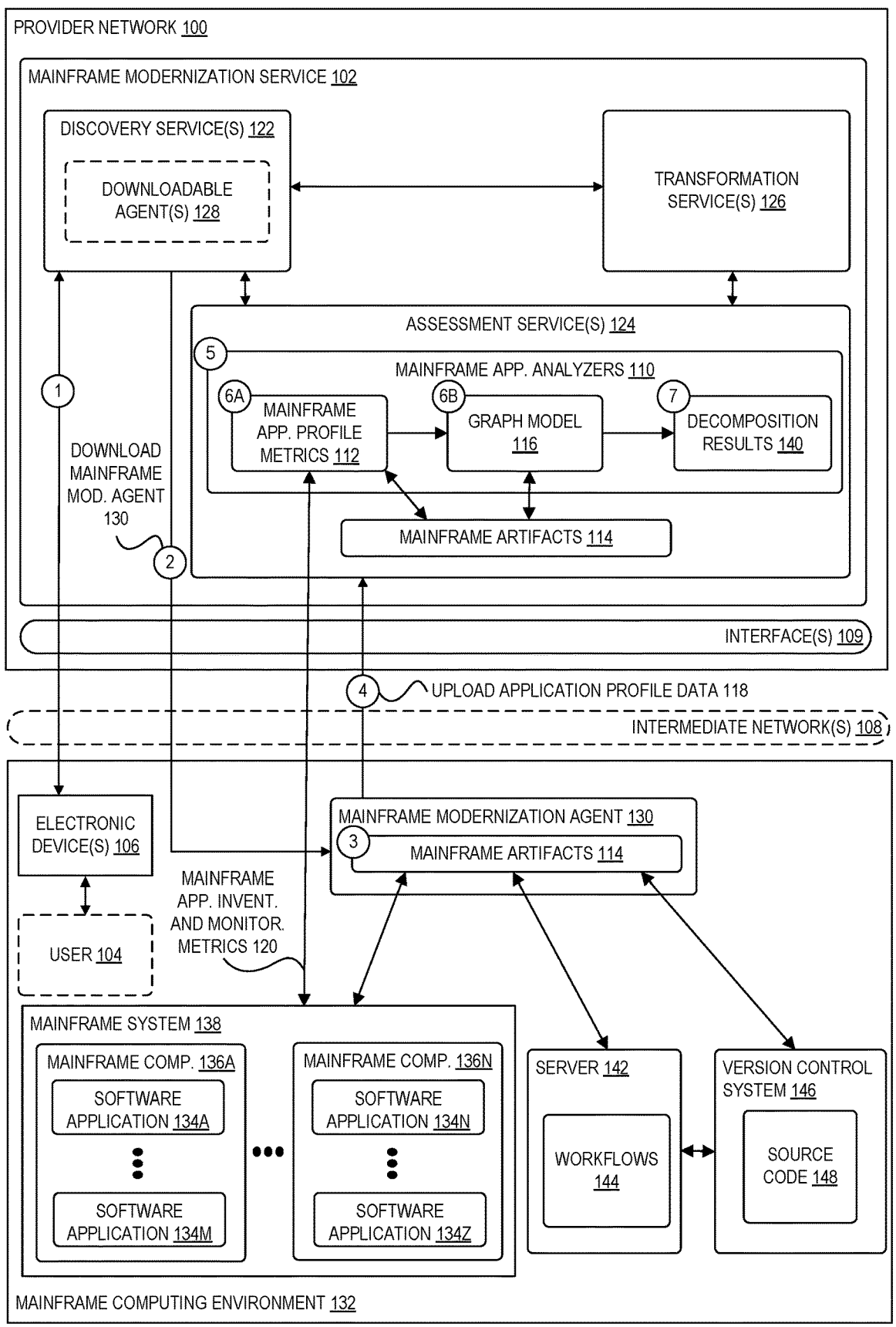
FIG. 1 is a functional block diagram illustrating an environment for enabling a mainframe modernization service of a provider network to remap mainframe functional components onto a network of distinct but communicating/collaborating provider network accounts, optionally organized in a hierarchical structure, as part of software modernization processes according to some embodiments.

The present disclosure relates to decomposition of mainframe monoliths into multi-account provider network structures. According to some embodiments, various mainframe functional components are decoupled into isolated blocks with very limited cross-dependencies. Those separate blocks are then remapped onto distinct provider network accounts to allow more granular management (e.g., SLA (service level agreement), security, governance, cost, etc.) of those accounts to provide multiple teams developing and operating those applications with different security and compliance controls, thereby facilitating isolation of the teams from one another for increased business agility and faster innovation.

Software modernization broadly refers to converting, rewriting, or porting legacy software applications or systems to more modern computer programming languages, software libraries, protocols, hardware platforms, application architectures, provider network-based services, and the like. Users, business organizations, and other entities often desire to modernize their various software applications and systems to improve operational performance, to increase application availability, to reduce exposure to vulnerabilities (e.g., software crashes, security vulnerabilities, etc.), to migrate applications from non-provider network environments to infrastructure provided by a provider network (e.g., to leverage a provider network's reliable infrastructure, increased performance benefits, etc.), and to enable more efficient ongoing development of the applications, among other possible reasons. In some cases, modernizing a software application involves refactoring a monolithic software application into smaller subunits, where each subunit includes an independent code base that can be independently maintained and deployed.

A mainframe computer, or simply "mainframe," is a computer used by organizations for critical applications like bulk data processing for tasks such as enterprise resource planning and large-scale transaction processing. A mainframe is often perceived as a single monolithic system where all components are tightly intertwined to deliver the services provided by the hosted application(s). Due to the wide functional scope covered by mainframe applications, business teams that use those applications might have entirely different business processes and/or be part of different business lines that need clarity and separation of incurred costs. Such business teams may also benefit from explicit security boundaries and mechanisms to have direct control and visibility of their service limits and any corresponding throttling (service quotas, API limits) of those, as well as a complete billing separation to directly map costs to underlying projects. The monolithic nature of mainframe applications, however, complicates the migration of such applications to a provider network environment. The present embodiments solve this technical problem, as described below.

While the description herein is presented with reference to a mainframe computing environment, and mainframe computers, the present embodiments are not limited to mainframe computing environments and mainframe computers. For example, some of the present embodiments may be leveraged to decompose monolithic software applications in other (non-mainframe) computing environments into multi-account provider network structures.

Some embodiments described below leverage the security and governance advantages provided by multiple accounts managed efficiently through service provider networks (e.g., AWS (Amazon Web Services) Organizations) for an efficient remapping of legacy applications from a mainframe to a provider network infrastructure. The intrinsic features of a multi-account provider network infrastructure foster agility while providing governance-enforcing isolation. Using multiple accounts in a provider network-based IT system to isolate and manage distinct business applications and data can improve many pillars of non-functional requirements including operational excellence, security, reliability, and cost reduction. For example, the isolation designed into a provider network account can help meet these needs as it acts as a strong identity and service access management isolation boundary. The compute resources and data are contained in the provider network account in which they are defined. When there is a need to share resources and data between two accounts, this access must be explicitly allowed. Some embodiments describe a mechanism to analyze and remap automatically the initial mainframe architecture into a maximal number of most granular accounts (e.g., covering the smallest possible functional perimeter) to benefit from all the advantages of a multi-account provider network infrastructure.

In some embodiments, provider network-based services (e.g., AWS Organizations) allow the efficient control and governance of multiple accounts. Mainframe workloads are rearchitected at a global level through service control policies (SCPs) applied hierarchically downward onto the tree reflecting the organization, with accounts being the leaves. Built-in support to consolidate and report activity logs, journals of provider API calls, security notifications, and/or costs across an entire set of accounts may also be provided.

In a provider network environment according to some embodiments, when sensitive data stores are limited to an account that is built to manage them, the number of people and processes that can access and manage this data store is intrinsically limited and can be easily constrained. This approach simplifies the process of achieving least privilege access. This isolation boundary by an account also advantageously provides a way to limit the risks of an application-related issue, misconfiguration, or malicious actions. If an issue occurs within one account, impacts to workloads contained in other accounts can be reduced or eliminated. The blast radius of such incidents can then be limited.

FIG. 1 is a diagram illustrating an environment that enables a mainframe modernization service 102 of a provider network 100 to remap mainframe functional components onto distinct provider network accounts, e.g., as part of modernization processes aimed at migrating mainframe applications to a provider network's infrastructure. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 108 (e.g., the internet) via one or more interface(s) 109, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 109 can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

In some embodiments, the multiple regions of the cloud provider network can be leveraged to provide better performance and higher resiliency. For example, many large organizations have a logical partition (LPAR) structure reflecting the geographical distribution of the lines of business (LoB). Due to the high costs of mainframe infrastructure, those LoB-based LPARs are typically centralized in a small number of datacenters. According to some of the present embodiments, when the accounts corresponding to the LPARs are broken into multiple accounts in a cloud provider network, the cloud accounts can be more widely distributed across different geographical locations and placed in a greater number of datacenters (as compared to the mainframe infrastructure). This wider geographic distribution in a greater number of datacenters provides better performance by locating accounts closer to the end users, and also provides greater resiliency by distributing accounts across more datacenters.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

In some embodiments, a mainframe modernization service 102 provides various types of mainframe modernization services and functionality, including discovery service(s) 122, assessment service(s) 124, and transformation service(s) 126, which are collectively aimed at discovering (and in some embodiments recommending) modernization and migration paths for mainframe software applications. The discovery service 122, for example, provide various services, software applications, software agents, and other tools (e.g., including downloadable mainframe modernization agents 130) used to identify software applications in a mainframe computing environment 132 and to collect profile information for software applications undergoing modernization processes. The assessment service 124 generally enable users and applications to obtain various types of software modernization assessments and recommendations, e.g., based on analyses of application artifacts (e.g., programs, files, queues, source code, bytecode, etc.) collected for mainframe applications by the discovery service 122 and associated tools. For example, the recommendations generated by the assessment service 124 can include recommended modernization strategies, recommended modernization tools, estimated modernization costs, etc. In some embodiments, the transformation service 126 generally include various services, applications, and other tools used to perform modernization actions and migrations, e.g., based on modernization recommendations generated by the assessment service 124. In some embodiments, one or more of the discovery service 122, the assessment service 124, and/or the transformation service 126 may obtain data describing mainframe artifacts associated with one or more mainframe computers, obtain profiling and interdependency data reflecting relationships among the mainframe artifacts, identify, based on the profiling and interdependency data, clusters of the mainframe artifacts, and generate a hierarchical set of accounts of the cloud provider network, where each account is assigned to one of the clusters of the mainframe artifacts. Some embodiments may further generate definitions to populate the hierarchical set of accounts of the cloud provider network. In some embodiments, information indicating a mapping between the hierarchical set of accounts of the cloud provider network and the clusters of the mainframe artifacts may be displayed, such as on a display for a user to view. An interface (e.g., a graphical user interface (GUI) on the display may enable the user to modify one or more aspects of the mapping, and/or accept the automatically generated mapping.

According to embodiments described herein, a mainframe modernization system generates decompositions of monolithic mainframe software applications undergoing modernization processes. For example, in some embodiments the assessment service 124 includes one or more application analyzers 110 configured to statically and/or dynamically analyze application artifacts (e.g., mainframe artifacts 114 including programs, files, queues, source code, bytecode, or other associated artifacts) obtained for mainframe software applications undergoing analysis (e.g., any of software applications 134A-134Z running on a mainframe system 138). In some embodiments, the source code or bytecode files may be obtained from a version control system 146, a server 142 (e.g., an automation server), or other storage locations within or external to a customer's computing environment 132. In the illustrated embodiment, the mainframe system 138 comprises multiple mainframe computers 136, at least some of which may comprise distinct physical machines. In some embodiments, one or more of the mainframe computers 136 may be located at a first premises, while others of the mainframe computers 136 may be located at premises that are geographically separated from the first premises. In some embodiments, the mainframe system 138 may comprise only a single mainframe computer 136. In some embodiments, the mainframe system 138 may comprise a network of multiple mainframe systems 138.

In some embodiments, based on various types of analyses performed, the application analyzer(s) 110 generate mainframe application profiling metrics 112 and one or more graph models 116 representing dependency relationships among mainframe application components (e.g., packages, files, classes, methods, variables, configuration parameters, etc.), among other possible information including detected anti-patterns and the like. In some embodiments, the graph model(s) 116 are used to generate decomposition results 140, which are used to guide the mainframe modernization process. In some embodiments, the decomposition results 140 may be used to recommend to a customer a proposed decomposition strategy that can be used as a guide to modernize the mainframe undergoing analysis. For example, the decomposition results 140 can include mainframe artifacts and/or provider network artifacts, which are described below. Also in some embodiments, the decomposition results 140 may be used to generate a hierarchical set of accounts in the cloud provider network, and to assign clusters of the mainframe artifacts to each account.

While the description herein is presented with reference to a mainframe computing environment 132, and a mainframe system 138, the present embodiments are not limited to mainframe computing environments and mainframe computers. For example, some of the present embodiments may be leveraged to decompose monolithic software applications in other (non-mainframe) computing environments into multi-account provider network structures. In another example, some mainframe systems include frontend machines handling user-interface tasks, and which have different architectures (e.g., x86-type architectures, or Sparc Solaris, or PowerPC AIX, etc.). Some of the present embodiments may propose an account structure for such frontend machines based on the logical partitions in the mainframe system with which they communicate.

In FIG. 1, the circles labeled "1"-"7" illustrate an example process in which a customer obtains the mainframe modernization agent 130 used to inventory software applications in the customer's mainframe computing environment including, e.g., processes related to automatically transforming a coherent set of initial mainframe artifacts (e.g., COBOL programs, JCL (Job Control Language) scripts, and their definitions for transactions and batch jobs) into new provider network artifacts (e.g., corresponding Java Lambda source code and AWS definitions). The process, in some embodiments, isolates subsets of coherent (e.g., functionally interdependent) mainframe artifacts in order to dispatch the corresponding new provider network artifacts after transformation into the adequate provider network accounts of smallest possible radius from the hierarchically-organized analysis of the initial mainframe definitions and artifacts producing several sets of provider network artifacts, one set per cloud account. In some embodiments, the analysis is conducted hierarchically from top to bottom structures of the mainframe to match its architecture, and also to correspond to the tree-based structure of some provider network services (e.g., AWS Organizations).

In some embodiments, at circle "1" in FIG. 1, a customer (e.g., a user 104) accesses the mainframe modernization service 102 (for example, via various interfaces provided by the discovery service 122) to obtain information about available modernization services and tools and to download one or more downloadable agents 128. In some embodiments, at circle "2," one or more particular mainframe modernization agents 130 are downloaded and installed on servers within a user's on-premises mainframe computing environment 132 (e.g., on a physical server or VM). In some embodiments, a user 104 uses an electronic device 106 (e.g., a computer) to interact with the mainframe modernization agent 130 via a command line interface (CLI), graphical user interface (GUI), or any other type of interface provided by the mainframe modernization agent 130.

In the illustrated embodiment, the user 104 and the electronic device 106 are located in the mainframe computing environment 132. In some embodiments, the user 104 (and/or the electronic device 106) may be located elsewhere, such as in the provider network 100, or outside either of the provider network 100 or the mainframe computing environment 132 but able to communicate with at least one of the provider network 100 or the mainframe computing environment 132 using one or more intermediate connections and/or networks. Also, in some embodiments, the mainframe modernization agent 130 may not be downloaded and installed within the mainframe computing environment 132. Rather, in such embodiments the functionality of the mainframe modernization agent 130 may be implemented in the provider network 100 by the mainframe modernization service 102, which communicates with the mainframe system 138.

In one example, at the circle labeled "2" in FIG. 1, the user 104 has used the electronic device 106 to obtain and install the mainframe modernization agent 130 on a computing device within the mainframe computing environment 132 to assist with modernizing one or more software applications 134A-134Z running in the mainframe computing environment 132. The software applications 134A-134Z, for example, generally represent any type of software that may be executing in a mainframe computing environment (e.g., business application software, etc.). Each of the software applications 134A-134Z can be a single process (may also be referred to as "address space") or a group of interoperating processes, and may execute within a virtualized or non-virtualized execution environment (e.g., the Java® virtual machine (JVM) in the case of a Java application, or any other execution environment for other types of applications).

As part of a modernization assessment process, in some embodiments, at circle "3," a user invokes an inventory command provided by the mainframe modernization agent 130. The inventory command may be used to analyze the mainframe computing environment 132, including the mainframe system 138. The analysis of the mainframe computing environment 132 identifies applications within the mainframe computing environment 132 that can be assessed (e.g., including some or all of software applications 134A-134Z in the example of FIG. 1) and, in some embodiments, performs various preliminary analyses of the identified applications. In some embodiments, instead of interacting directly with the mainframe modernization agent 130, the user 104 may instead interact with a web-based console or other interface provided by the mainframe modernization service 102. The mainframe modernization service 102 may then instruct the mainframe modernization agent 130, or other application running in the mainframe computing environment 132, to perform some or all of the application inventory and monitoring metrics 120 collection operations described with reference to FIG. 1, such as, for example, identifying an inventory of applications, obtaining mainframe artifacts 114 for the applications (e.g., including source code or binary program files, JAR files, process identifiers, etc.), among other possible types of application profile information described herein. In some embodiments, the analysis of the mainframe system 138 proceeds hierarchically from top to bottom structures to match the architecture of the mainframe system 138, and also to correspond to the tree-based structure of some provider network services (e.g., AWS Organizations). The hierarchical analysis may include the following layers, in descending order: the network of mainframe systems 138, then each mainframe system 138 itself, physical separation (e.g., geographic separation) between machines of the mainframe system 138, logical partitions (LPARs) within the mainframe system 138 and/or within mainframe computers 136, separation of workloads for batch applications and transactional applications within the mainframe system 138 (and/or separation of batch components and transactional components of application workloads), separation of batch/transactional accounts, and security of the mainframe architecture. Each of these layers is discussed in detail below.

In some embodiments, the mainframe modernization agent 130 collects dynamic runtime information about discovered software applications including, e.g., process identifiers, runtime artifacts such as binary executables, JAR files, etc. The mainframe modernization agent 130 can further collect source code 148 and system definitions defining their implementation/rollout, for example, stored in a version control system 146 or other storage location within the mainframe computing environment 132 or elsewhere. In some embodiments, a user provides the mainframe modernization agent 130, mainframe modernization service 102, or both, with authentication information (e.g., a username and password, security token, etc.) that can be used to access the version control system based on a URL or other access identifier.

In some embodiments, the user 104 may further configure the mainframe modernization agent 130 with the ability to access a server 142 in the mainframe computing environment 132, the provider network 100, or elsewhere, e.g., to collect bytecode files or other types of application artifacts. In some embodiments, the server 142 is an automation server that broadly represents any type of server, service, application, or other tool that helps automate various software development processes such as, for example, building, testing, and deploying software applications. An automation server 142, for example, may automate such processes to facilitate a continuous integration and continuous delivery approach to software development and deployment. In some embodiments, the server 142 is a server-based system that interfaces with version control tools (e.g., a version control system 146) to identify changes to a repository (e.g., code commits) or other events and may further include configurations used to automate one or more actions responsive to the detection of such events. In some embodiments, the server 142 may be used to configure any number of workflows 144 (sometimes also referred to as "jobs," "chains," "pipelines," or "projects"), each representing a defined configuration of automated processes for building, testing, and/or deploying software applications. In this example, each workflow may be associated with a configuration file or other data that defines various actions, parameters (e.g., locations of source repositories, names of binary executable files to be generated, locations at which to store binary executable files, etc.). In some embodiments, the server 142 provides an interface (e.g., a network-accessible API) via which users and applications can request server-related information and perform various actions including, e.g., obtaining a list of configured workflows, obtaining configuration information associated with configured workflows, creating new workflows, etc.

In the illustrated embodiment, the server 142 and the version control system 146 are shown in FIG. 1 as being outside of, or separate from, the mainframe system 138. In some embodiments, either or both of the server 142 or the version control system 146 may be within the mainframe system 138. Also in some embodiments, either or both of the server 142 or the version control system 146 may be partially within, and partially outside of, the mainframe system 138.

In some embodiments, at circle "4," the mainframe modernization agent 130 uploads application profile data 118 including identifiers of the discovered software applications in the mainframe computing environment 132. The assessment service 124 may use the uploaded application profile data, for example, to create a software application list that associates the identified software applications with a user account associated with the user 104. The software application list, for example, may be displayed to a user in a GUI or other interface to provide a user with information about the discovered set of applications in the mainframe computing environment 132. In other embodiments, the application profile data is stored only locally by the mainframe modernization agent 130.

In some embodiments, at circle "5," the assessment service 124 initiates processes, at circles "6A" and "6B," to analyze a mainframe application identified by the mainframe modernization agent 130 to identify subunits of the software application, e.g., as part of a process aimed at decomposing a monolithic mainframe application. For example, in some embodiments, the mainframe modernization service 102 or the mainframe modernization agent 130 receives a request to identify subunits of a mainframe application, where each subunit of the subunits represents a component of the mainframe application that can be implemented as an independently deployable component of the mainframe application. In some embodiments, responsive to such requests, one or more application analyzer(s) 110 generates one or more mainframe application profiling metrics 112 (at circle "6A"), a graph model 116 (at circle "6B"), or both, collectively representing and providing information about the mainframe application being analyzed.

Figure 2:
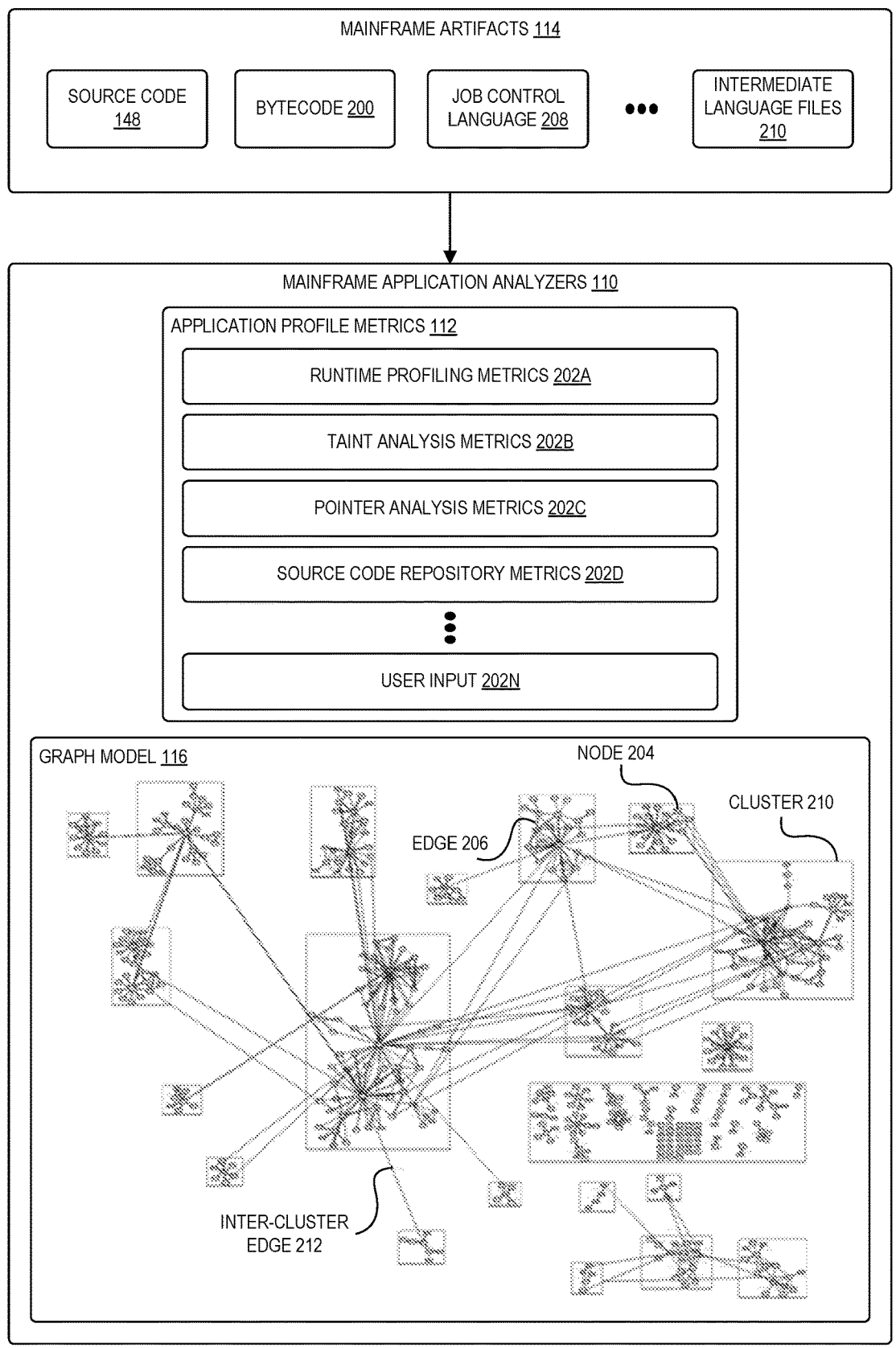
FIG. 2 is a functional block diagram illustrating example mainframe application profile metrics generated by one or more mainframe application analyzers and the generation of a graph model representation of a monolithic mainframe software application according to some embodiments.

FIG. 2 is a diagram illustrating the generation of mainframe profiling metrics and a graph-based model of a mainframe undergoing modernization processes according to some embodiments. In some embodiments, mainframe artifacts 114, including source code 148, bytecode 200, Job Control Language (JCL) 208, intermediate language files 210, or combinations thereof, include various application components (e.g., packages, classes, methods, data objects, etc.) that are provided as input to the mainframe application analyzer 110 for analysis of use relationships. These use relationships generally can represent any combination of static source code-derived use relationships (e.g., because of a class referring to another class, or a method in one class referencing a method in a different class), build-time use relationships, and dynamic runtime use relationships.

As indicated, in some embodiments, the mainframe application analyzer(s) 110 perform various types of analyses on the mainframe system 138 to obtain any number of separate mainframe application profiling metrics 112. These mainframe application profiling metrics 112 comprise data representing at least one of: runtime profiling metrics 202A representative of at least one of: a cardinality of program calls between application components, a latency of program calls between application components, or resources used to process program calls between application components; taint analysis metrics 202B representative of sources of user input into the mainframe application and associated data flows through the mainframe application; pointer analysis metrics 202C representative of application components that refer to a same shared object in memory; dynamic reference metrics representative of application components that refer to a same runtime instance of a data object; source code repository metrics 202D representative of information associated with source code file statistics relative to a version control system (e.g., indicating a frequency of updates to particular files, instances of files being checked into contemporaneously, etc.); or user input 202N specifying information about particular application use relationships. In some embodiments, the mainframe application profiling metrics 112 can be associated with varying types of application abstractions and components, e.g., package, file, class, method, or data object-associated metrics. In some embodiments, the mainframe application profiling metrics 112 include data derived from static analysis, such as by parsing source code to detect dependencies. The mainframe application profiling metrics 112 may therefore include one or both of dynamic runtime data or static structural information.

In some embodiments, the mainframe application analyzer 110 also generates a graph model 116 representing identified use relationships among the mainframe artifacts 114. As shown, the graph model 116 includes nodes (e.g., node 204; may also be referred to as vertices) each representing mainframe artifacts (e.g., programs, files, queues, database definitions, system configurations, interactive screen designs, job scripts (e.g., JCLs), dialog scripts, etc.) and edges (e.g., edge 206) each representing a use-type relationship (e.g., calls, accesses, reads from, writes to, etc.) between the mainframe artifacts. In some embodiments, a web-based console or standalone application GUI can display a graphical representation of the graph model 116.

With reference to FIG. 2, the nodes 204 of the graph model 116 are clustered based on use relations between and among the nodes 204. In some embodiments, the mainframe artifacts 114 are analyzed using a graph partitioning algorithm to group together nodes that have high density of use relationships. This grouping generates clusters 210 of nodes 204, where each cluster 210 represents a set of mainframe artifacts with a high density of use relationships. In some embodiments, the boundary of each cluster 210 corresponds to a perimeter of a provider network account where artifacts with high density of use relationships will be gathered. Thus, each cluster 210 corresponds to a separate account in the provider network for the migrated mainframe application. This account definition strategy may also, in some embodiments, be used for the separation of transactional-type and batch-type accounts in the provider network, as described below. With further reference to FIG. 2, some nodes 204 that are in different clusters 210 are connected by inter-cluster edges 212. The inter-cluster edges 212 correspond to inter-account use cases allowing the clusters 210 to interact to deliver the global features of the mainframe application.

In some embodiments, information about the identified clusters 210 can be stored as decomposition results 140, e.g., in a file, database, or other type of data store. For example, the decomposition results 140 may be stored as machine-readable data that can be used by other modernization services or tools, e.g., to display information about the proposed decomposition or to automatically perform various decomposition operations. In some embodiments, at circle "7" in FIG. 1, the mainframe application analyzer 110 generates the decomposition results 140 based on the generated and analyzed graph model 116. In some embodiments, the decomposition results 140 include a mapping of the identified clusters 210 to accounts of the cloud provider network. In some embodiments, the decomposition results 140 can be used to generate various GUIs displayed to a user via the mainframe modernization agent 130, the mainframe modernization service 102, or both. In some embodiments, one or more such GUIs may display the mapping of the identified clusters 210 to accounts of the cloud provider network.

Figure 3:
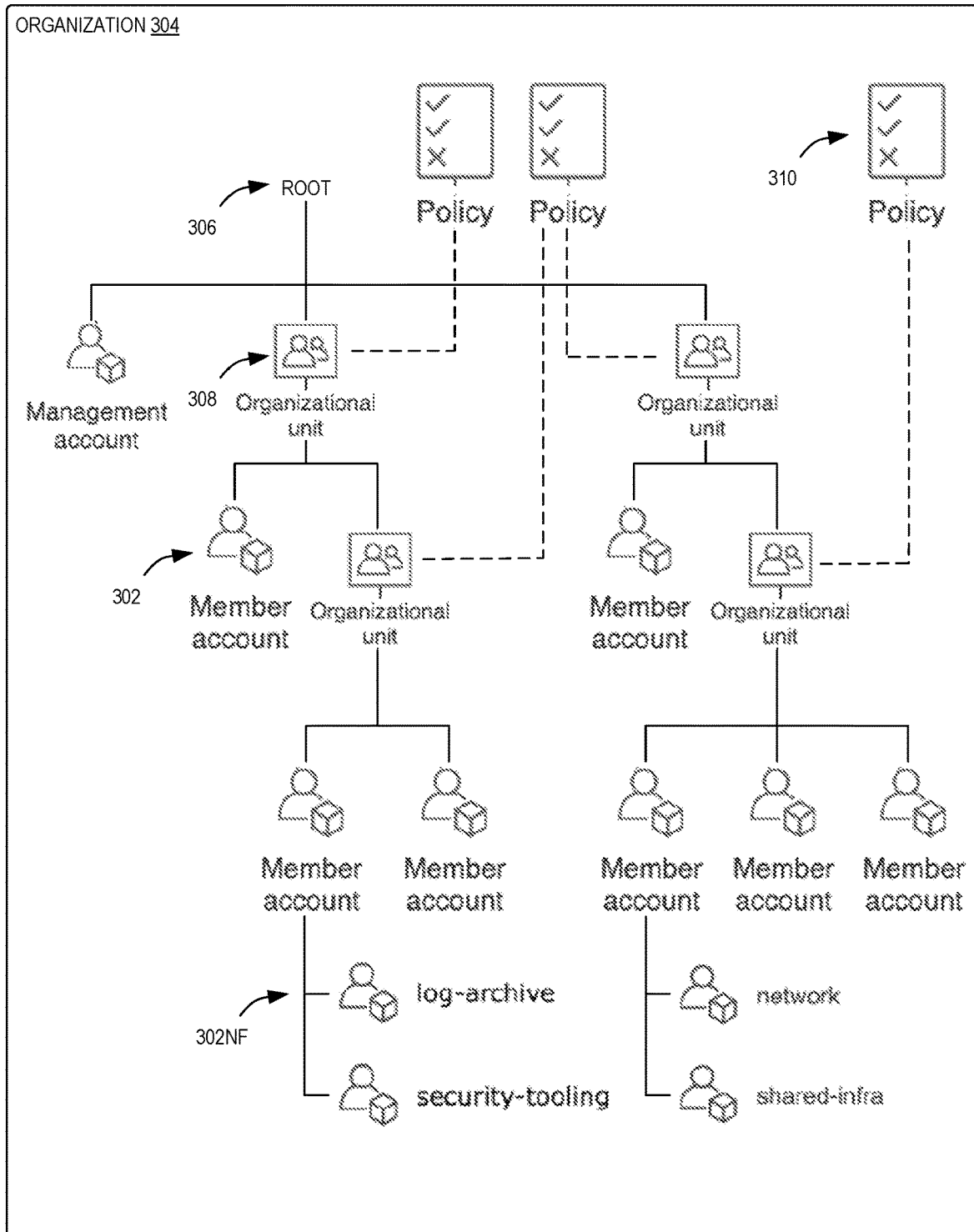
FIG. 3 is an organizational tree diagram illustrating an example mapping of sets of mainframe artifacts to hierarchical accounts of a cloud provider network according to some embodiments.

For example, FIG. 3 is an organizational tree diagram 300 illustrating an example mapping of sets of mainframe artifacts to hierarchical accounts of a cloud provider network according to some embodiments. In some embodiments, the tree diagram 300 may be displayed in a GUI that enables a user to visualize the decomposition of the mainframe applications and the mapping of subunits of the mainframe applications to distinct cloud provider network accounts 302. The tree diagram 300 represents an organization 304, which groups accounts 302 within a root 306, which is a parent container for all accounts 302 for the organization 304. The non-limiting example organization 304 represented in FIG. 3 includes seven accounts 302 that are organized into four organizational units (OUs) 308 under the root 306. In some embodiments, levels of the tree diagram 300 are defined by the various levels of the analysis of the mainframe system 138. For example, the network of mainframe systems 138 may be mapped to the root 306, while lower levels of the tree diagram 300 may be mapped to each mainframe system 138 itself, LPARs, batch/transactional workloads/accounts, and security of the mainframe architecture, respectively. In some organizations, LPARs are mapped with lines of business (LoBs). For such organizations, the technical mapping described above also corresponds to a business mapping, such that different LoBs are mapped to different accounts 302 in the tree diagram 300. When those LoBs are geographically separated, the corresponding attached accounts may advantageously be located in different regions for increased performance and resiliency, as discussed above.

In some embodiments, the hierarchical accounts in the cloud provider network may include one or more non-functional accounts 302NF. Such non-functional accounts 302NF may not deliver any application services (e.g., batch or transactional), but rather may centralize some tools or features delivering non-functional requirements. Such non-functional accounts 302NF may be implemented in separate account parts of the AWS Organizations tree 300 to make it more efficient and reliable. As illustrated in FIG. 3, log-archive, security-tooling, network, and shared-infra are examples of such non-functional accounts 302NF.

The organization 304 also includes three policies 310 that are applied to the OUs 308. In some embodiments, the clusters 210 representing sets of mainframe artifacts 114 are mapped to respective ones of the accounts 302. In some embodiments, when a policy 310 is attached to one of the nodes in the hierarchy, it flows down and affects all the branches (OUs 308) and leaves (accounts 302) beneath it. Thus, for example, if a policy 310 is applied to the root 306, it applies to all OUs 308 and accounts 302 in the organization 304. In some embodiments, an OU 308 can also contain other OUs 308, as shown in FIG. 3 where each of the OUs 308 in the upper layer of the tree diagram 300 contains another OU 308 in the next layer down in the tree diagram 300.

In some embodiments, the user may be enabled to confirm or change the automated partitioning generated by the decomposition operations, prior to the automated partitioning being executed to generate the various provider network accounts. For example, information relating to the decomposition results 140 may be displayed in one or more GUIs, which may include one or more input components (e.g., sliders, buttons, radio buttons, widgets, etc.) that enable the user to confirm the automated partitioning, or to change one or more aspects of the automated partitioning, prior to the generation of the provider network accounts.

In some embodiments, definitions may be generated to auto-populate the accounts 302. For example, the analysis of the mainframe artifacts 114 may generate a separation of the mainframe artifacts 114 and subsystems into various accounts 302. In some embodiments, the system can generate definitions of the corresponding mainframe artifacts 114 in the corresponding target accounts 302. For example, a CICS (Customer Information Control System) transactional workload in the mainframe system 138 may be replaced by one or several AWS Mainframe Modernization (M2) Applications in the same or different accounts in the provider network 100 and hosting the initial legacy workload. Those M2 Applications may be located in corresponding M2 Environments. Batch workloads in the mainframe system 138 may also be translated to similar M2 Applications and Environments in the provider network 100. In some embodiments, the decomposition system may generate the corresponding definitions for Applications and Environments via CloudFormation (CFN) templates. Similarly, a mainframe DB2 database in the mainframe system 138 may be converted into one or several AWS RDS/Aurora database instances hosted in one or several accounts 302 in the provider network 100. Similarly, the decomposition process may generate CFN template(s) for those database instances. IBM RACF (Resource Access Control Facility) security definitions in the mainframe system 138 may be analyzed and converted to corresponding AWS Cognito or IAM (Identity and Access Management) users or IAM roles and AWS IAM security policies in the provider network 100.

In some embodiments, binary-augmented decomposition processes can be used to automatically decompose mainframe applications based on identified subunits. For example, an analysis of only the source code associated with an application might miss various build-time components and other components associated with frameworks or third-party tools. A framework or third-party tool, for example, might perform code generation or modify the code based on annotations at build time that are not directly evident in the source code. In some embodiments, the mainframe modernization service 102 performs a two-phase application analysis process, including an analysis of the source code and an analysis of associated bytecode or other artifacts to determine how to refactor an application's implementation based on a recommended application decomposition. In some embodiments, the mainframe modernization service 102 then reconciles or merges graphs generated by the various analyses by identifying common nodes and unique nodes and overlaying the graphs on one another. The resulting hybrid model, for example, identifies relationships identified using both analysis processes and can provide a more complete representation of an application for automatic decomposition purposes.

Figure 4:
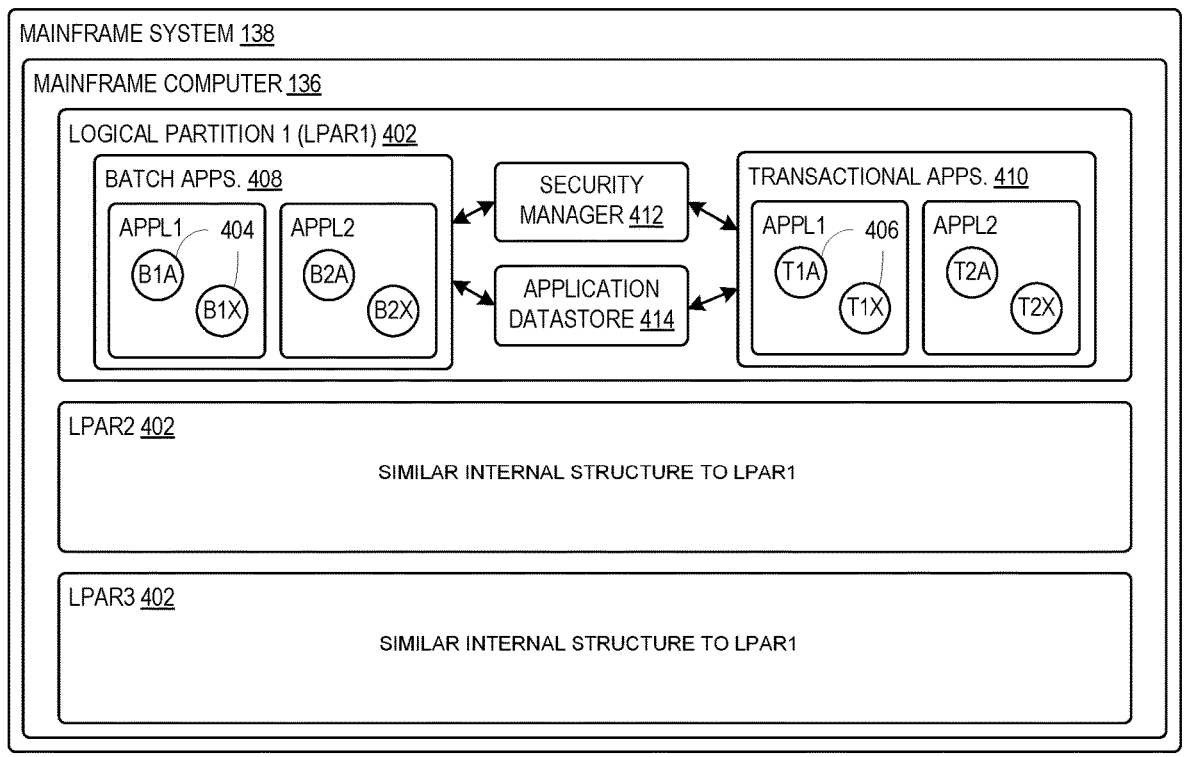
FIG. 4 is a functional block diagram illustrating hierarchical analysis of layers of a mainframe computer according to some embodiments.

As described above, some embodiments analyze the mainframe system 138 hierarchically from top to bottom structures to match the architecture of the mainframe system 138, and also to correspond to the tree-based structure of some provider network services (e.g., AWS Organizations). With reference to FIG. 4, in some embodiments the hierarchical analysis includes the following layers, in descending order: the mainframe system 138 itself, physical separation (e.g., geographic separation) between mainframe computers 136 of the mainframe system 138, logical partitions (LPARs) 402 within the mainframe system 138 and/or within the mainframe computers 136, separation of workloads 404/406 for batch applications 408 and transactional applications 410 within the mainframe system 138 (and/or separation of batch components and transactional components of application workloads), separation of batch and transactional accounts within the mainframe system 138, and security of the mainframe architecture. Each of these layers is discussed in detail below. In some embodiments, the hierarchical analysis may obtain the mainframe artifacts 114 from at least one of a security manager 412 or an application datastore 414. The security manager 412 is discussed in further detail below.

Physical Separation

To aggregate massive computing power and implement sophisticated high availability architecture, a mainframe computer may couple several machines in the same datacenter in a parallel sysplex (systems complex) arrangement. A parallel sysplex is a cluster of machines acting together as a single system image. Sometimes used for disaster recovery, parallel sysplex combines data sharing and parallel computing to allow a cluster of systems to share a workload for high performance and high availability. In some embodiments, those machines are part of a geographically dispersed parallel sysplex (GDPS). Therefore, the logical partitions, whose analysis is described below, may be located within a single physical machine, but also in separate machines either in the same datacenter as part of a parallel sysplex or in distinct locations coupled via a GDPS. In some embodiments, the physical separation of mainframe computers 136 and/or LPARs via the GDPS in the mainframe system 138 is used as an indicator that corresponding provider network accounts should also be separated (e.g., in different AZs or even in different regions) in the resulting provider network topology. For example, mainframe artifacts corresponding to physically separated machines and/or LPARs of the mainframe system 138 may be mapped to separate accounts in the provider network.

Logical Partitions (LPARs)

Mainframe systems are usually very large and powerful machines achieving massive throughput. For manageability reasons, those massive computing engines are divided into distinct logical partitions (LPARs), each running their own independent system image. The boundaries may be defined by the need for separation of different business lines or different applications, and the LPARs may be operated and managed independently of each other, and sometimes by different teams. In some embodiments, automated analysis of the low-level system partitioning configuration files of the mainframe system 138 (e.g., via parsing) enables detection of these partitions for understanding their configurations and hardware allotments.

Because LPARs are similar to VMs under the control of a hypervisor, at least insofar as they are capable of executing multiple application workloads, a granular provider network architecture according to some embodiments allows the LPARs to run as a distinct and isolated set of accounts. LPARs, therefore, may represent another level of account separation in the provider network. For example, the existence of LPARs on the mainframe system 138 (e.g., within one or more mainframe computers 136) may be used in some embodiments to create an intermediate layer in the organizational tree structure. As described below, additional layers in the tree are defined through other mechanisms subdividing the LPARs into more granular functional blocks. In some embodiments, the automated analysis of the low-level system partitioning configuration files of the mainframe system 138 may be limited to analyzing only a subset of the running LPARs, or may even skip the LPAR analysis step if the entire machine is run as a single LPAR.

In some organizations, for the same reasons that processing is separated into distinct LPARs (e.g., decoupling for greater operational independence), business data may also be separated into many independent database schemas. On the mainframe, for various reasons (e.g., costs), those schemas may be managed under a single database engine. In a provider network architecture according to some embodiments, each such schema may advantageously be isolated in a distinct schema powered by its own independent engine, and optionally in a different provider network account.

Separation of Workloads for Batch Applications and Transactional Applications

Mainframe applications include two types of workloads: Batch jobs and transactions. Batch jobs comprise a long-running suite of programs and utilities that is triggered ad hoc or at scheduled times to run across a massive amount of data (e.g., global activity closing for the end of a business period). Transactions, by contrast, are short actions triggered and driven by end-users of the system or external events (e.g., cash retrieval at an ATM, transferring funds to another account, a consumer ordering an item via a website, etc.). These two types of workloads have different technical and functional profiles. It is therefore useful to separate each kind of workload in an additional and distinct layer of the account tree for several reasons, as discussed below.

In one example, batch jobs are usually (very) heavy in their demand for compute power, I/O, etc. This translates into high consumption of requests for provider network services. This high consumption may bring some of those provider network services to their limit, as defined by the provider. In some embodiments, the isolation of those demanding workloads (or even other batch workloads) in separate accounts prevents any negative impact on transactional workloads for which SLAs (e.g., throughput, latency) may be very stringent. This high service consumption of batch jobs happens in separate accounts, and leaves the service limits fully available to transactions in the accounts in which those transactions are hosted.

In another example, batch jobs may be charged to different internal accounts than transactions. For example, global reporting and analytics may be charged to the HQ marketing team, while transactions costs may be charged to operational business units. Therefore, in some embodiments, having distinct provider network accounts for batch jobs versus transactions facilitates a straightforward allocation of corresponding costs.

Separation of Batch Accounts

Additionally, the definitions of batch jobs (e.g., in scripting language) in the mainframe system 138 may be separated into various libraries, for example corresponding to different applications. One non-limiting example of a scripting language is Job Control Language (JCL), which is used on IBM mainframe operating systems to instruct the system on how to run a batch job or start a subsystem. More specifically, the purpose of JCL is to say which programs to run in a specific order, using which files or devices for input or output, and at times to also indicate under what conditions to skip a step. Parameters in the JCL can also provide accounting information for tracking the resources used by a job as well as which machine the job should run on. In some embodiments, the automated parsing of those JCL libraries enables the various jobs to be mapped to different provider network accounts based on the library in which each job resides, or based on other criteria (e.g., JCL naming conventions).

In some embodiments, the automated analysis and parsing of the system configuration of the mainframe system 138 (e.g., parameter files, JCL libraries and source code of application programs linked by those libraries) enables the separation of batch workloads from transactional workloads into distinct multi-level subtrees including provider network accounts as the leaves. In some embodiments, the automated analysis and parsing of the system configuration of the mainframe system 138 further enables the subtree for batch-workload provider network accounts to be defined based on the organizations of the JCLs. This subtree allows attachment of additional service control policies (e.g., organizational policies for managing permissions in an organization) at each level of the batch-workload subtree to better define the service quotas allowed for those specific jobs.

In some embodiments, the content of accounts hooked at the leaf level of the batch-workload subtree may be defined by deep parsing of the JCL libraries. This static analysis may, in some embodiments, extract all the JCL scripts, all the programs or utilities called by the JCL scripts, and all the datasets or databases required by the JCL scripts. This deep parsing advantageously may surface interactions with other systems (e.g., partitions in the same mainframe, peripheral devices, external systems, etc.) and their definitions. This deep parsing advantageously may also identify dependencies that jobs may have through use of the same data through different programs. The mainframe artifacts resulting from this deep parsing may define all components that should be collocated in a single provider network account for the corresponding batch jobs to work on the provider network in their limited account as they were working on the mainframe system 138.

Some embodiments may also run specific analysis on all the programs of the mainframe system 138 to identify the frequency of the programs being called in other source programs, and/or to identify dependencies of the programs themselves. For example, when a program is called very frequently by other programs, but itself calls other programs only rarely, such a program may be identified as a utility program whose duplication in multiple accounts in the provider network (e.g., with proper management procedure for new version) may be permitted, because the cloning of such a program in several account has no impact on the coherency of functional data.

Separation of Transactional Accounts

Transactions on the mainframe system 138 may run under the control of a transaction monitor. For example, in IBM machines, CICS (Customer Information Control System) is a general-purpose transaction processing subsystem. CICS is middleware that sits between the z/OS IBM mainframe operating system and business applications. As an online transaction processing (OLTP) system, it is used to build customer transaction application programs. In another example, IBM Information Management System (IMS) is a hierarchical database management software system for online transaction processing (OLTP) and online batch processing. Several instances of such monitors may run in parallel in a given LPAR on the mainframe system 138. Their numbers may vary based on various criteria, such as independent manageability, SLA of the application that they host, etc. The various application transactions are then defined in those instances based on various criteria, such as application affinity, joint availability requirement, served business unit, etc. Those transactional instances are each defined by a separate configuration, where the transactions that they host are parametrized in detail in text files (e.g., DFHCSD, etc.) that can be parsed. In some embodiments, the parsing of those configuration files identifies the head program (e.g., starting program) of each transaction, as well as related configuration parameters. The further parsing of the source code of this head program and its callee tree identifies artifacts required by a given transaction. It also identifies resources (e.g., message queues, data files, etc.) shared with other transactions of the same monitor instance (or with other instances through cross-instance resource sharing features, such as Distributed Program Link, Function Shipping, Transaction Routing, etc. which may be logically considered as a Multi-Region Operation). This dependance on common resources (e.g., data, resources, and other programs) may be used in some embodiments to define a subset of transactions that should reside in a same account in the provider network. The mainframe artifacts corresponding to this set of collocated transactions may be provided as input to the mainframe modernization agent 130 to set up the provider network account with the transformed artifacts and the corresponding service definitions. The process may be repeated for each instance of transaction monitors in the LPAR.

Security of the Mainframe Architecture

Figure 5:
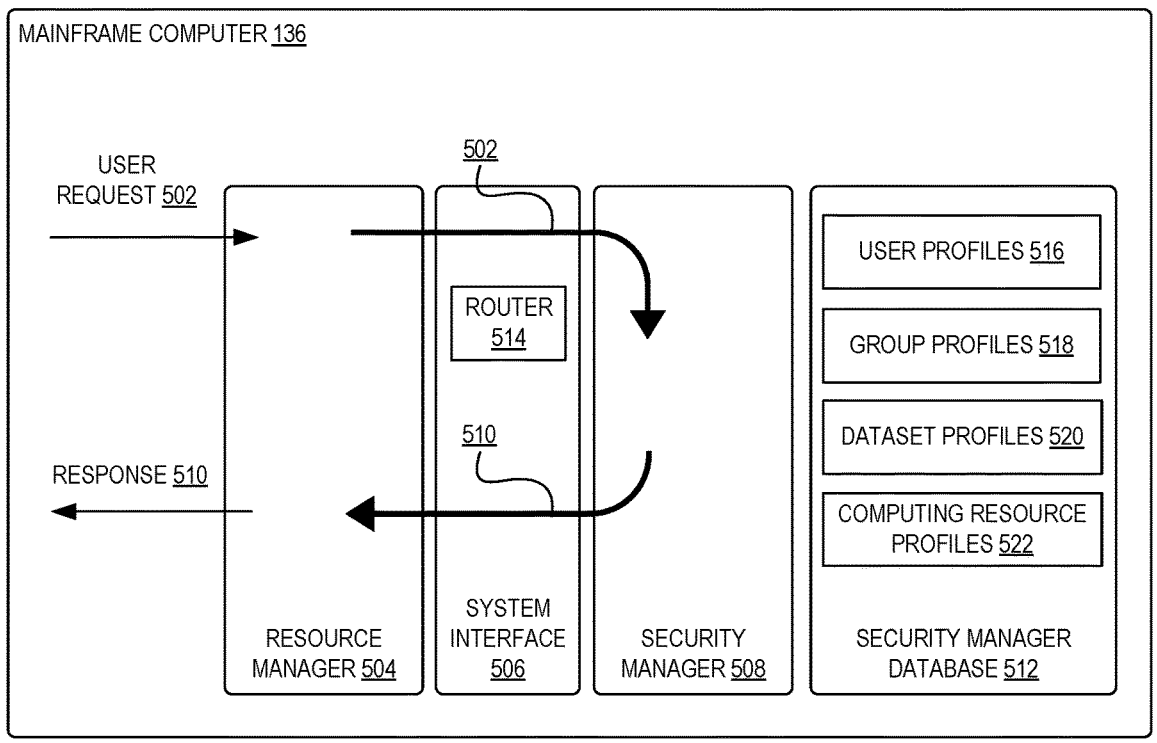
FIG. 5 is a functional block diagram illustrating a fully centralized security architecture of a mainframe computer according to some embodiments.

In some embodiments, the security architecture of the mainframe system 138 may provide an advantageous benefit for decomposing mainframe applications into multi-account provider network structures. With reference to FIG. 5, when the security architecture of the mainframe system 138 is fully centralized, all user requests 502 handled by resource managers 504 for any kind of action may reach a system interface 506 (e.g., SAF (System Authorization Facility) in IBM machines) that transfers the requests to a security manager 508 (e.g., IBM RACF (Resource Access Control Facility), Computer Associates Top Secret or ACF2 (Access Control Facility 2)), where all corresponding security definitions are centralized. For example, access control provided by the security manager 508 may authenticate users and then holistically protect data sets and other data or processing resources from unauthorized use, destruction, modification, or disclosure, whether by accident or design. Responses 510 to user requests 502 may originate from, or pass through, the security manager 508 and/or the system interface 506. In some embodiments, the security manager 508 may correspond to the security manager 412 shown in FIG. 3.

The security manager 508 includes a security manager database 512 that stores a set of user, group, and profile information. In some embodiments, the database 512 is accessible through the system interface 506 to all subsystems in the operating system (e.g., z/OS) environment.

In some embodiments, the system interface 506 is a centralized interface that can direct control to (third-party) security products. The system interface 506 may include a router 514 that acts as a central point of control for all system products that provide resource control. The components of system products that provide resource management call the router 514 for information that they need to make access control decisions. The router 514 determines that these calls should be handled by the system interface 506, and the system interface 506 is the single interface that all system products invoke to communicate with external security products for processing that takes place as part of these access control decisions.

In some embodiments, the security manager database 512 may store objects used to configure the system security, including one or more of user profiles 516, group profiles 518, dataset profiles 520, or computing resource profiles 522. User profiles 516 may contain information about a given user, such as a user ID, password, info, default group, etc. The user profiles may include a base definition segment containing common information and optional segments describing information related to more specific subsystems (e.g., time sharing (e.g., TSO (Time Sharing Option)), CICS, etc.). Group profiles 518 may comprise a collection of user and group profiles. For example, a security manager group may include the users that have similar requirements for access to the system's resources. Dataset profiles 520 may protect access to a given file (e.g., a discrete profile) or to a group of files (e.g., a generic profile—via their naming). Computing resource profiles 522 may comprise general resources such as CICS resources (e.g., TS (temporary storage) queues or TD (transient data) queues, transactions, programs, files, etc.), database (e.g., Db2) resources, hierarchical database management (e.g., IMS-DB) resources (e.g., transactions, etc.), job entry subsystem (JES2/JES3) resources, programs, DASD (direct access storage device) or tape volumes, terminals, etc.

In some embodiments, the data contained within the security manager database 512 may be used by the assessment services 124 (or the mainframe modernization agent 130) to build a graph with two types of nodes or vertices: 1) principals (e.g., users or other system components) or groups of principals, and 2) resources or groups of resources. The edges of the graph connect principals to resources, and indicate that the principals are authorized to access or use the resources to which they are connected. In some embodiments, characteristics of the edges (e.g., color, line weight, etc.) indicate more precise types of authorizations (e.g., open file for read and write, open file for read-only, start transaction, etc.). In some embodiments, the mainframe modernization agent 130 may build the graph with principals and resources as vertices and authorizations as edges. Then, the graph may be provided as input to a graph cluster analysis algorithm to isolate groups of resources that are authorized for a given group of users. Non-limiting examples of graph cluster analysis algorithms that may be used to analyze the graph include k-spanning tree, shared nearest neighbor, betweenness centrality based, highly connected components, maximal clique enumeration, or kernel k-means. The clusters resulting from the security analysis may be intersected with the clusters resulting from the workloads analysis (described above) to obtain a smaller radius for provider network accounts as defined by smaller sets of mainframe artifacts.

In some embodiments, a manual input to the graph cluster analysis may be to specify that one or more users have special privileges, and will be excluded from the analysis to improve the granularity of the clustering. These "superusers" may be isolated in a specific account, and may be given their same special privileges through cross-account authorization features available in the provider network platform.

Figure 6:
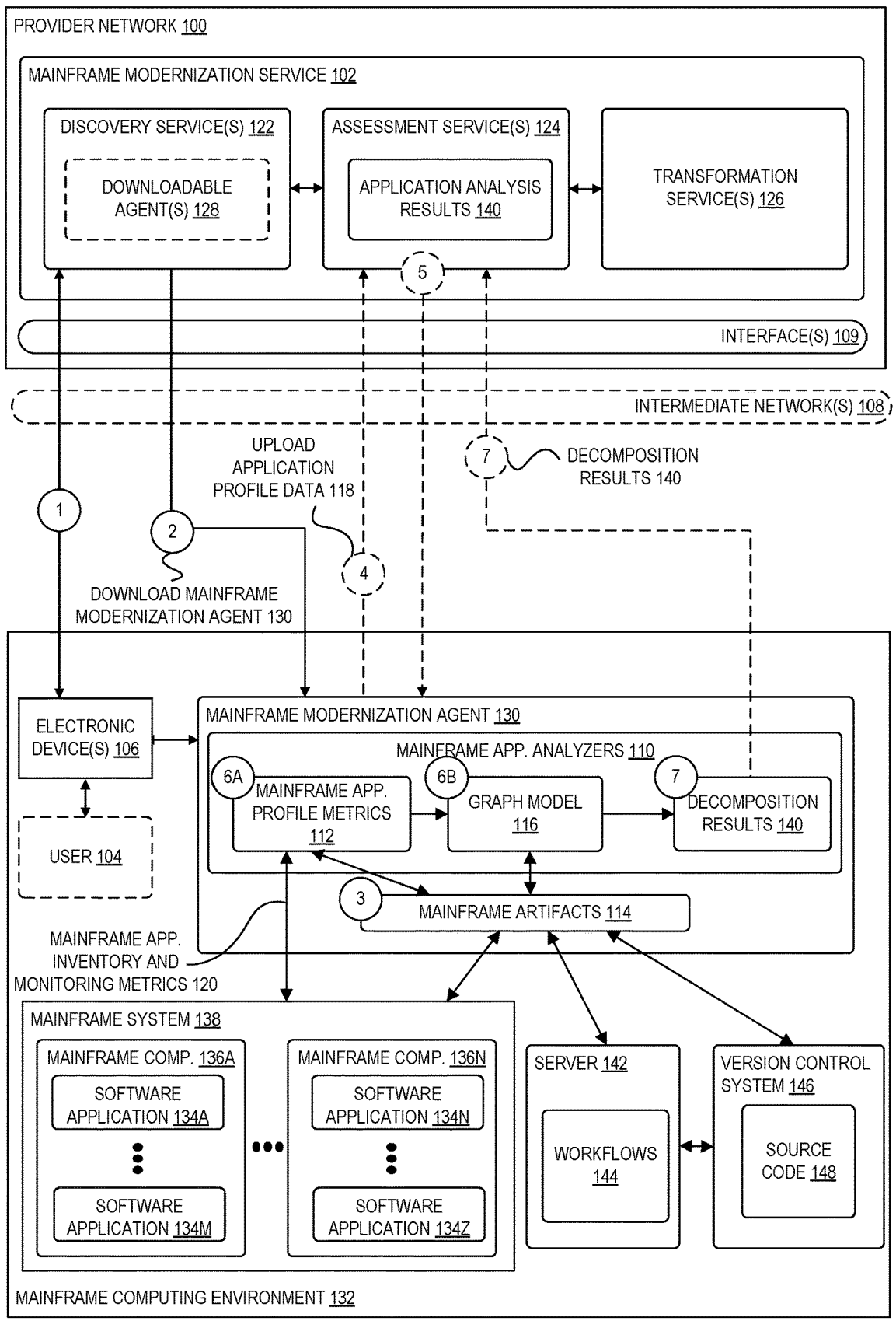
FIG. 6 is a functional block diagram illustrating another environment for enabling a mainframe modernization service of a provider network to remap mainframe functional components onto distinct provider network accounts according to some embodiments.

FIG. 6 is a diagram illustrating another environment that enables a mainframe modernization service 102 of a provider network 100 to remap mainframe functional components onto distinct provider network accounts. Compared to the environment illustrated in FIG. 1, for example, the mainframe application analyzers 110 are provided as components of the mainframe modernization agent 130. In this example, the mainframe modernization agent 130 can be used to collect the mainframe artifacts 114, and perform some or all of the processes associated with the mainframe application profile metrics 112, the graph model 116, and the decomposition results 140, as described above with reference to FIG. 1. Also in this example, at circle "4," the mainframe modernization agent 130 optionally uploads the application profile data 118, including identifiers of the discovered software applications in the mainframe computing environment 132, to the assessment service 124. Further in this example, at circle "5," either or both of the assessment service 124 and/or the mainframe modernization agent 130 initiates the processes at circles "6A" and "6B."

As described above, some embodiments provide an automated system that analyzes the configuration (e.g., parameters of the configurations of the various subsystems) of a mainframe system, including the application artifacts (e.g., source code of various languages, JCL scripts, data schema definitions, etc.), as a whole, to generate an advanced multi-account provider network structure on the distinct infrastructure of a service provider network with all resulting advantages of account isolation, and where segregation of duty and principle of least privilege are enforced toward a maximum or optimum.

In some embodiments, the automated system produces multiple sets of mainframe artifacts that are provided as input to a migration/transformation process (e.g., rehosting, replatforming, refactoring, etc.) of mainframe workloads to produce new sets of provider network artifacts and corresponding target provider network definitions out of each of the sets of mainframe artifacts and their source definitions corresponding to a separate provider network account. The automated analysis may, in some embodiments, produce separate sets of mainframe artifacts per account to be defined in the provider network.

In various embodiments, the sets of mainframe artifacts may be provided as input to different migration/transformation processes. For example, the various sets of mainframe artifacts may be better served each by different migration/transformation processes based on the objectives of the migration for each created account in the provider network. Non-limiting examples of migration/transformation processes include rehosting (e.g., LzLabs Software Defined Mainframe), replatforming (e.g., Micro Focus), or automated refactoring (e.g., Blu Age).

In some embodiments, the automated analysis is a multi-layer analysis including a network of mainframe machines, mainframe partitioning, workload class, application structure, and security where some of the layer-based steps can be skipped or merged depending on desired outcomes. This analysis may, in some embodiments, produce a flat list of accounts defined by their sets of mainframe artifacts.

In some embodiments, the list of account can be organized as a tree created from the hierarchical analysis described above. In some embodiments, service control policies can be defined in a context like AWS Organizations for operational enforcement at the different levels of the tree to harvest the benefits (conciseness, DRY (Don't Repeat Yourself), etc.) of such hierarchical definitions.

In some embodiments, the automated analysis may comprise a partition-level analysis to define an upper layer of the resulting hierarchical account tree. This layer matches the constraints and requirements of the LPAR structure of the mainframe. Some LPARs may be skipped in the remapping through corresponding directives if the target of the transformation is only a fragment of the mainframe.

In some embodiments, the partitions under analysis can be located within a single physical machine, but also in separate machines either in the same datacenter as part of a parallel sysplex or in distinct locations coupled via a geographically dispersed parallel sysplex (GDPS). The physical separation of LPARs via the GDPS may be used, in some embodiments, as an indicator that corresponding accounts in the provider network should also be separated (e.g., in different AZs or even in different regions) in the resulting provider network topology. For example, mainframe artifacts corresponding to physically separated machines and/or LPARs of the mainframe system 138 may be mapped to separate accounts in the provider network. In some embodiments, accounts corresponding to geographically distant machines may be defined by another provider network to reinforce the hardware availability objectives of the initial GDPS.

In some embodiments, further analysis and separation may happen at the level of workload type. The parsing of system definitions for existing workloads advantageously enables the separation of batch workloads and transactional workloads into different sets of accounts. This separation enables separate billings, restricting security (via service control policies) to least privilege principle, and also avoids damaging interference (e.g., service limits, etc.) between those workloads with different requirements in terms of SLAs.

In some embodiments, further analysis and separation may happen within the workloads typed as batch to further cluster subsets of jobs into distinct accounts based on clustering of use relations across program artifacts, data, and/or other resources. In some embodiments, if multiple sets of jobs reside in the same job monitor instance in the mainframe computer, those sets of jobs are separated into distinct accounts in the provider network, while in other embodiments the multiple sets of jobs are retained in a single account in the provider network because they are in same job monitor instance initially.

In some embodiments, further analysis and separation may happen within the workloads typed as transaction to further cluster subsets of transactions into distinct accounts based on the clustering of use relations across program artifacts, data, and/or other resources. In some embodiments, if multiple sets of transactions reside in the same transaction monitor instance in the mainframe computer, those sets of transactions are separated into distinct accounts in the provider network, while in other embodiments the multiple sets of transactions are retained in a single account in the provider network because they are in same transaction monitor instance initially.

In some embodiments, a cross-account authorization mechanism of the target provider network platform may be used to allow entities needing cross-account privileges (e.g., superusers, application functions crossing account boundaries for processing or data, etc.) to receive them. The automated analysis may remember that it isolated some interdependent resources in different accounts and provide information, as part of the mainframe artifacts, to the migration/transformation process so that the migration/transformation process can grant proper cross-account access authorizations via the security framework (e.g., IAM (Identity and Access Management) for AWS).

In some embodiments, the security definitions may be leveraged as described above to further reduce the perimeter of the provider network account. For example, the resource clusters extracted by the analysis of which principals are authorized to access which resources may be intersected with the clusters defined by the other functional analysis levels to break such clusters into smaller clusters that are limited to resources usable by a common set of principals.

Figure 7:
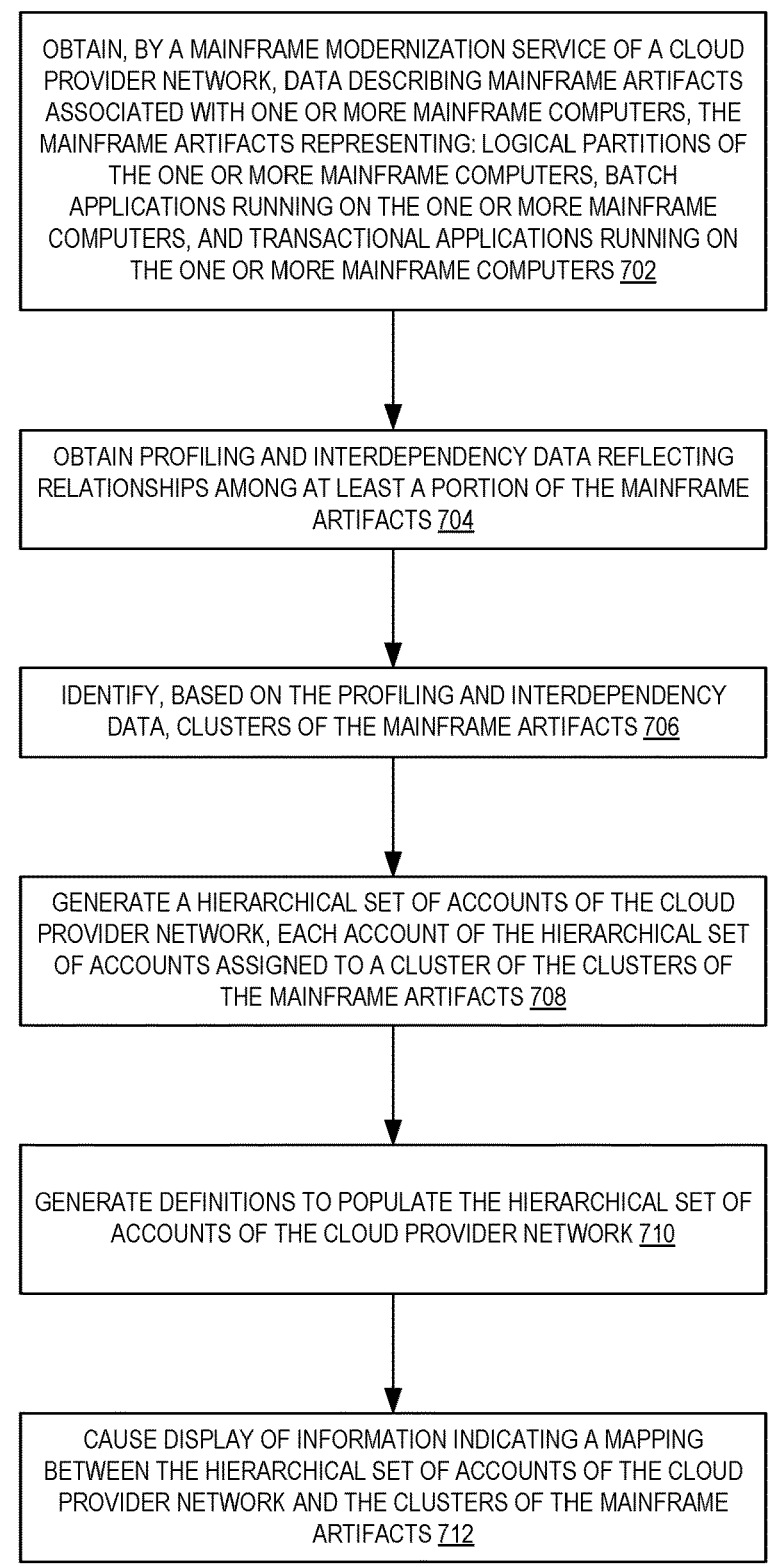
FIG. 7 is a flow diagram illustrating operations of a method for enabling a mainframe modernization service of a provider network to remap mainframe functional components onto distinct provider network accounts as part of software modernization processes according to some embodiments.

FIG. 7 is a flow diagram illustrating operations 700 of a method for enabling a mainframe modernization service of a provider network to remap mainframe functional components onto distinct provider network accounts as part of software modernization processes according to some embodiments. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 700 are performed by the mainframe modernization service/agent 102/130 of the other figures.

The operations 700 include, at block 702, obtaining, by a mainframe modernization service of a cloud provider network, data describing mainframe artifacts associated with one or more mainframe computers. The mainframe artifacts include logical partitions (LPARs) of the one or more mainframe computers, batch applications running on the one or more mainframe computers, and/or transactional applications running on the one or more mainframe computers. In some embodiments, the mainframe modernization service 102 (FIG. 1) obtains the data describing the mainframe artifacts 114 associated with the one or more mainframe computers 136. In some embodiments, the data describing the mainframe artifacts is obtained by analyzing, hierarchically, one or more of physical separation between LPARs of the mainframe system (e.g., where the mainframe system includes multiple mainframe computers), LPARs within the mainframe computer(s), separation of workloads for batch applications and transactional applications within the mainframe computer(s), separation of batch and transactional accounts within the mainframe computer(s), and/or security of the mainframe architecture.

The operations 700 further include, at block 704, obtaining runtime profiling and interdependency data reflecting relationships among at least a portion of the mainframe artifacts. In some embodiments, the mainframe modernization service 102 (and/or the mainframe modernization agent 130, or other application running in the mainframe computing environment 132) obtains the runtime profiling and interdependency data (e.g., the application inventory and monitoring metrics 120 described with reference to FIG. 1. In some embodiments, block 704 may further include obtaining system configuration definitions.

The operations 700 further include, at block 706, identifying, based on the runtime profiling and interdependency data, clusters of the mainframe artifacts. In some embodiments, identifying the clusters of the mainframe artifacts comprises generating, based at least in part on the mainframe artifacts, a graph model representing relationships among the mainframe artifacts. The graph model includes nodes representing the mainframe artifacts and edges connecting pairs of the mainframe artifacts. The edges represent use relationships between the pairs of the mainframe artifacts.

The operations 700 further include, at block 708, generating a hierarchical set of accounts of the cloud provider network, where each account of the hierarchical set of accounts is assigned to one of the clusters of the mainframe artifacts.

The operations 700 further include, at block 710, generating definitions to populate the hierarchical set of accounts of the cloud provider network.

The operations 700 further include, at block 712, causing display of information indicating a mapping between the hierarchical set of accounts of the cloud provider network and the clusters of the mainframe artifacts.

Figure 8:
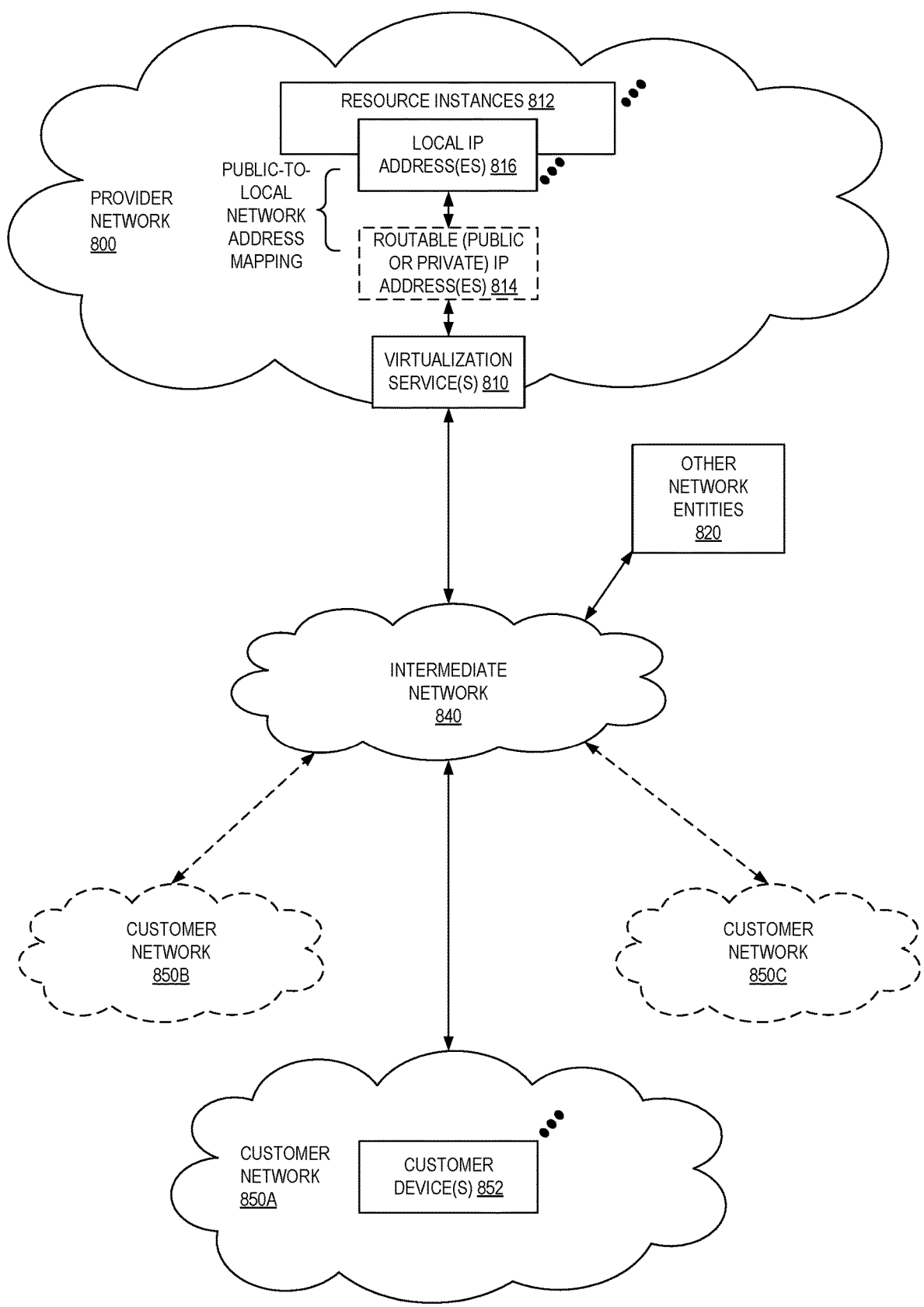
FIG. 8 illustrates an example provider network environment according to some embodiments.

FIG. 8 illustrates an example provider network (or "service provider system") environment according to some embodiments. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some embodiments, the provider network 800 can also provide routable (public or private) IP addresses 814 and/or IP address ranges (e.g., Internet Protocol version 4 (IPv4) or Internet Protocol version 6 (IPv6) addresses) that customers can obtain from the provider 800. In some embodiments, the provider network 800 may not provide any routable IP addresses 814, and may instead work with private IP addresses only, and may properly route network traffic with private IP addresses used by a customer on-premises, as long as everything remains coherent as per ranges allowed in RFC1918 (Address Allocation for Private Internets).

Conventionally, the provider network 800, via the virtualization services 810, can allow a customer of the service provider (e.g., a customer that operates one or more customer networks 850A-850C (or "client networks") including one or more customer device(s) 852) to dynamically associate at least some routable IP addresses 814 assigned or allocated to the customer with particular resource instances 812 assigned to the customer. The provider network 800 can also allow the customer to remap a routable IP address 814, previously mapped to one virtualized computing resource instance 812 allocated to the customer, to another virtualized computing resource instance 812 that is also allocated to the customer. Using the virtualized computing resource instances 812 and routable IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination routable IP address 814 published by the customer network(s) 850A-850C; the traffic is routed to the service provider data center, and at the data center is routed, via a network substrate, to the local IP address 816 of the virtualized computing resource instance 812 currently mapped to the destination routable IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
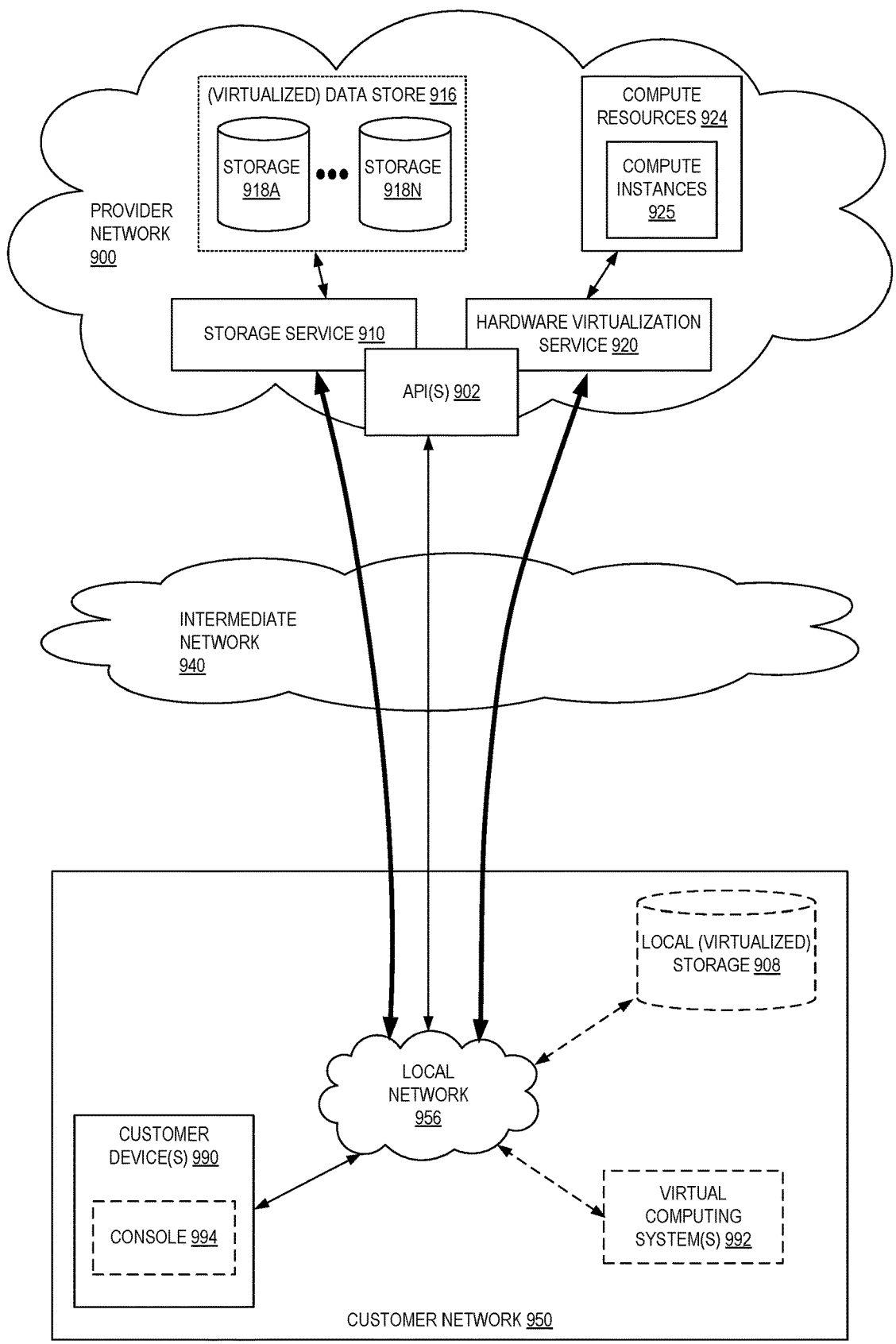
FIG. 9 is a block diagram of an example provider network that provides a storage service and a hardware virtualization service to customers according to some embodiments.

FIG. 9 is a block diagram of an example provider network environment that provides a storage service and a hardware virtualization service to customers, according to some embodiments. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some embodiments, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some embodiments, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some embodiments, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some embodiments, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
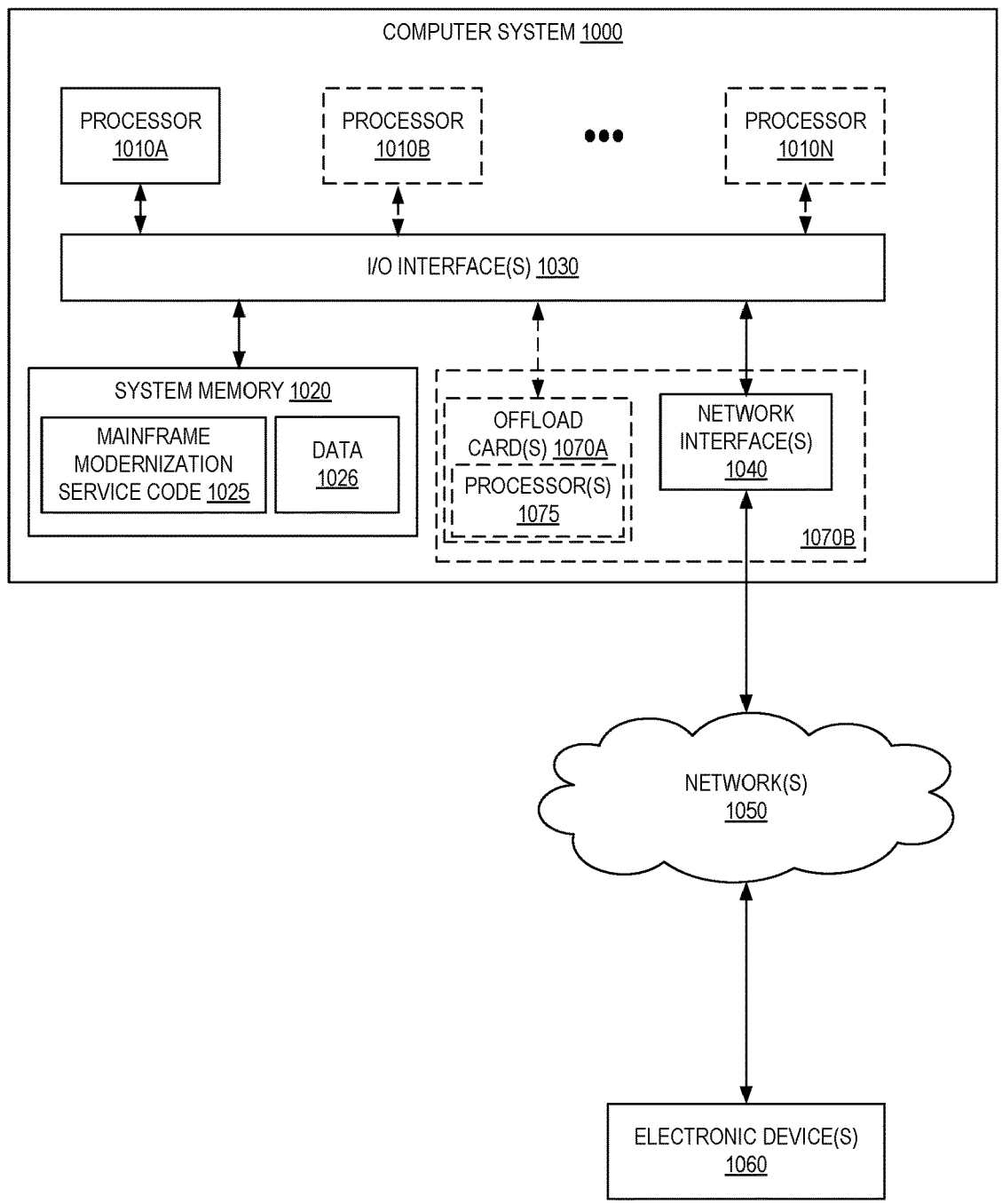
FIG. 10 is a block diagram illustrating an example computer system that can be used in some embodiments.

In some embodiments, a system that implements a portion or all of the techniques described herein can include a general-purpose computer system, such as the computer system 1000 illustrated in FIG. 10, that includes, or is configured to access, one or more computer-accessible media. In the illustrated embodiment, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various embodiments the computer system 1000 can include one computing device or any number of computing devices configured to work together as a single computer system 1000.

In various embodiments, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various embodiments, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various embodiments, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1020 as mainframe modernization service code 1025 (e.g., executable to implement, in whole or in part, the mainframe modernization service 102) and data 1026.

In some embodiments, the I/O interface 1030 can be configured to coordinate I/O traffic between the processor 1010, the system memory 1020, and any peripheral devices in the device, including the network interface 1040 and/or other peripheral interfaces (not shown). In some embodiments, the I/O interface 1030 can perform any necessary protocol, timing, or other data transformations to convert data signals from one component (e.g., the system memory 1020) into a format suitable for use by another component (e.g., the processor 1010). In some embodiments, the I/O interface 1030 can include support for devices attached through various types of peripheral buses, such as a variant of the Peripheral Component Interconnect (PCI) bus standard or the Universal Serial Bus (USB) standard, for example. In some embodiments, the function of the I/O interface 1030 can be split into two or more separate components, such as a north bridge and a south bridge, for example. Also, in some embodiments, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various embodiments, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a Quick-Path interconnect (QPI) or UltraPath interconnect (UPI)). For example, in some embodiments the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some embodiments the offload card(s) 1070A or 1070B can perform compute instance management operations, such as pausing and/or un-pausing compute instances, launching and/or terminating compute instances, performing memory transfer/copying operations, etc. These management operations can, in some embodiments, be performed by the offload card(s) 1070A or 1070B in coordination with a hypervisor (e.g., upon a request from a hypervisor) that is executed by the other processors 1010A-1010N of the computer system 1000. However, in some embodiments the virtualization manager implemented by the offload card(s) 1070A or 1070B can accommodate requests from other entities (e.g., from compute instances themselves), and can not coordinate with (or service) any separate hypervisor.

In some embodiments, the system memory 1020 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C#, C++, COBOL, PL/1, Fortran, or any scripting language, such as Perl, Python, PHP, or TCL, as well as combinations thereof. The server(s) can also include database servers, including without limitation those commercially available from Oracle®, Microsoft®, Sybase®, IBM®, etc., as well as any of those available from the OSS (open-source software) ecosystem, such as PostgreSQL, MariaDB, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser.

It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters (e.g., 918A-918N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including." and "includes" are used to indicate open-ended relationships and therefore mean including, but not limited to. Similarly, the words "have," "having." and "has" also indicate open-ended relationships, and thus mean having, but not limited to. The terms "first," "second." "third." and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method for remapping mainframe functional components from a mainframe computing environment onto distinct accounts of a cloud provider network, the method comprising:
   receiving, at a mainframe modernization service executed by one or more processors in the cloud provider network, a request to analyze one or more mainframe computers in the mainframe computing environment to identify mainframe software applications for decomposition;
   analyzing, by the mainframe modernization service, the one or more mainframe computers and obtaining data describing mainframe artifacts associated with the mainframe software applications, the analyzing proceeding hierarchically through structures of a mainframe architecture of the one or more mainframe computers, the structures including physical separation between machines of the one or more mainframe computers, logical partitions (LPARs) within the one or more mainframe computers, separation of workloads for batch applications and transactional applications of the one or more mainframe computers, and security of the mainframe architecture;
   obtaining profiling and interdependency data reflecting relationships among at least a portion of the mainframe artifacts;
   identifying, based on the profiling and interdependency data, clusters of the mainframe artifacts, the identifying comprising:
      generating a graph model representing relationships among the mainframe artifacts, the graph model including:
         nodes representing the mainframe artifacts; and
         edges connecting pairs of the mainframe artifacts, the edges representing use relationships between the pairs of the mainframe artifacts;
   generating a hierarchical set of accounts of the cloud provider network, each account of the hierarchical set of accounts assigned to a cluster of the clusters of the mainframe artifacts; and
   generating definitions to populate the hierarchical set of accounts of the cloud provider network; and
   causing display of information indicating a mapping between the hierarchical set of accounts of the cloud provider network and the clusters of the mainframe artifacts.

2. The computer-implemented method of claim 1, the graph model further including inter-cluster edges corresponding to inter-account use cases for the distinct accounts in the provider network.

3. The computer-implemented method of claim 1, wherein generating a hierarchical set of accounts of the cloud provider network comprises using the LPARs of the one or more mainframe computers to map corresponding ones of the mainframe artifacts to separate ones of the accounts of the cloud provider network.

4. A computer-implemented method comprising:
   obtaining, by a mainframe modernization service of a cloud provider network, data describing mainframe artifacts associated with one or more mainframe computers, the mainframe artifacts representing: logical partitions (LPARs) of the one or more mainframe computers, batch applications running on the one or more mainframe computers, and transactional applications running on the one or more mainframe computers;
   obtaining profiling and interdependency data reflecting relationships among at least a portion of the mainframe artifacts;
   identifying, based on the profiling and interdependency data, clusters of the mainframe artifacts;
   generating a hierarchical set of accounts of the cloud provider network, each account of the hierarchical set of accounts representing a service access management isolation boundary for compute resources and data in the cloud provider network corresponding to a respective cluster of the clusters of the mainframe artifacts, wherein generating the hierarchical set of accounts of the cloud provider network limits impacts from a first account of the hierarchical set of accounts to workloads contained in other accounts of the hierarchical set of accounts;
   generating definitions to populate the hierarchical set of accounts of the cloud provider network; and causing display of information indicating a mapping between the hierarchical set of accounts of the cloud provider network and the clusters of the mainframe artifacts.

5. The computer-implemented method of claim 4, the identifying, based on the profiling and interdependency data, clusters of the mainframe artifacts comprising generating, based at least in part on the mainframe artifacts, a graph model representing relationships among the mainframe artifacts.

6. The computer-implemented method of claim 5, the graph model including:
nodes representing the mainframe artifacts; and
edges connecting pairs of the mainframe artifacts, the edges representing use relationships between the pairs of the mainframe artifacts.

7. The computer-implemented method of claim 6, the graph model further including inter-cluster edges corresponding to inter-account use cases for the hierarchical set of accounts of the cloud provider network.

8. The computer-implemented method of claim 4, wherein generating a hierarchical set of accounts of the cloud provider network comprises using the LPARs of the one or more mainframe computers to map corresponding ones of the mainframe artifacts to separate ones of the accounts of the cloud provider network.

9. The computer-implemented method of claim 4, further comprising creating an organizational tree structure including the accounts of the cloud provider network.

10. The computer-implemented method of claim 9, further comprising using the LPARs of the one or more mainframe computers to create an intermediate layer in the organizational tree structure.

11. The computer-implemented method of claim 4, the mainframe artifacts further comprising separation of workloads for batch applications and transactional applications of the one or more mainframe computers.

12. The computer-implemented method of claim 4, the mainframe artifacts further comprising security of a mainframe architecture of the one or more mainframe computers.

13. The computer-implemented method of claim 4, the profiling and interdependency data including one or more of:
runtime profiling metrics;
taint analysis metrics representative of sources of user input into a mainframe application and associated data flows through the mainframe application;
pointer analysis metrics representative of application components that refer to a same shared object in memory;
dynamic reference metrics representative of application components that refer to a same runtime instance of a data object;
source code repository metrics representative of information associated with source code file statistics relative to a version control system; or
user input specifying information about particular application use relationships.

14. The computer-implemented method of claim 13, the runtime profiling metrics representative of one or more of:
a cardinality of program calls between application components;
a latency of program calls between application components; or
resources used to process program calls between application components.

15. A system comprising:
one or more electronic devices implementing a mainframe modernization service in a provider network, the mainframe modernization service including instructions that, upon execution by one or more processors, cause the mainframe modernization service to:
obtain data describing mainframe artifacts associated with one or more mainframe computers, the mainframe artifacts representing: logical partitions (LPARs) of the one or more mainframe computers, batch applications running on the one or more mainframe computers, and transactional applications running on the one or more mainframe computers;
obtain profiling and interdependency data reflecting relationships among at least a portion of the mainframe artifacts;
identify, based on the profiling and interdependency data, clusters of the mainframe artifacts;
generate a hierarchical set of accounts of the cloud provider network, each account of the hierarchical set of accounts representing a service access management isolation boundary for compute resources and data in the cloud provider network corresponding to a respective cluster of the clusters of the mainframe artifacts, wherein generating the hierarchical set of accounts of the cloud provider network limits impacts from a first account of the hierarchical set of accounts to workloads contained in other accounts of the hierarchical set of accounts; and
cause display of information indicating a mapping between the hierarchical set of accounts of the cloud provider network and the clusters of the mainframe artifacts.

16. The system of claim 15, the identifying, based on the profiling and interdependency data, clusters of the mainframe artifacts comprising generating, based at least in part on the mainframe artifacts, a graph model representing relationships among the mainframe artifacts.

17. The system of claim 16, the graph model including:
nodes representing the mainframe artifacts; and
edges connecting pairs of the mainframe artifacts, the edges representing use relationships between the pairs of the mainframe artifacts.

18. The system of claim 17, the graph model further including inter-cluster edges corresponding to inter-account use cases for the hierarchical set of accounts of the cloud provider network.

19. The system of claim 15, the mainframe artifacts further comprising separation of workloads for batch applications and transactional applications of the one or more mainframe computers.

20. The system of claim 15, the mainframe artifacts further comprising security of a mainframe architecture of the one or more mainframe computers.

\* \* \* \* \*